United States Patent
Balliett et al.

(10) Patent No.: US 11,962,200 B1
(45) Date of Patent: Apr. 16, 2024

(54) STATOR BUSBAR

(71) Applicant: Rivian IP Holdings, LLC, Irvine, CA (US)

(72) Inventors: Logan Noel Balliett, Los Angeles, CA (US); Dang Dinh Dang, Garden Grove, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/506,296

(22) Filed: Nov. 10, 2023

(51) Int. Cl.
*H02K 11/00* (2016.01)
*H02K 3/50* (2006.01)
*H02K 15/00* (2006.01)

(52) U.S. Cl.
CPC ........... *H02K 11/0094* (2013.01); *H02K 3/50* (2013.01); *H02K 15/0062* (2013.01); *H02K 2203/09* (2013.01); *H02K 2213/09* (2013.01)

(58) Field of Classification Search
CPC .................................................. H02K 2203/09
USPC ........................................................... 310/71
See application file for complete search history.

(56) References Cited

U.S. PATENT DOCUMENTS

| | | | | |
|---|---|---|---|---|
| 2012/0313460 | A1* | 12/2012 | Schaflein | H02K 5/225 310/43 |
| 2015/0061426 | A1* | 3/2015 | Nagumo | H02K 11/0094 310/58 |

OTHER PUBLICATIONS https://chargedevs.com/newswire/interplex-presents-new-customizable-motor-stator-busbar-for-ev-motors/.

* cited by examiner

*Primary Examiner* — Daniel C Puentes
*Assistant Examiner* — Minki Chang
(74) *Attorney, Agent, or Firm* — Foley & Lardner LLP

(57) ABSTRACT

An apparatus comprising a coupling member. The coupling member can be disposed between a first portion of a busbar connectable to a first component of a drive unit assembly and a second portion of the busbar connectable to a second component of the drive unit assembly. The coupling member can couple the first portion of the busbar with the second portion of the busbar. The coupling member can include a first segment, a second segment, and a third segment. The first segment can be parallel to the third segment and the first segment can be perpendicular to the second segment.

18 Claims, 8 Drawing Sheets

STATOR BUSBAR

INTRODUCTION

Vehicles can include electrical components. The electrical components can be electrically coupled with one another.

SUMMARY

This disclosure is generally related to one or more components of a vehicle. The components can include at least one apparatus. The apparatus can include at least one coupling member. The coupling member can include a movable and/or a flexible linkage. The apparatus can be included with a vehicle and/or one or more vehicle components. The coupling member can be disposed between a first portion and a second portion of a busbar. The busbar can be connected to one or more components of a drive unit assembly. For example, the busbar can be connected to a stator.

At least one aspect is directed to an apparatus. The apparatus can include a coupling member. The coupling member can dispose between a first portion of a busbar connectable to a first component of a drive unit assembly and a second portion of the busbar connectable to a second component of the drive unit assembly. The coupling member can couple the first portion of the busbar with the second portion of the busbar. The coupling member can include a first segment, a second segment, and a third segment. The first segment can be parallel to the third segment and the first segment can be perpendicular to the second segment.

At least one aspect is directed to a vehicle. The vehicle can include an apparatus. The apparatus can include a coupling member. The coupling member can dispose between a first portion of a busbar connectable to a first component of a drive unit assembly and a second portion of the busbar connectable to a second component of the drive unit assembly. The coupling member can couple the first portion of the busbar with the second portion of the busbar. The coupling member can include a first segment, a second segment, and a third segment. The first segment can be parallel to the third segment and the first segment can be perpendicular to the second segment.

At least one aspect is directed to a method. The method can include disposing a coupling member between a first portion of a busbar connectable to a first component of a drive unit assembly and a second portion of the busbar connectable to a second component of the drive unit assembly. The coupling member can couple the first portion of the busbar with the second portion of the busbar. The coupling member can include a first segment, a second segment, and a third segment. The first segment can be parallel to the third segment and the first segment can be perpendicular to the second segment.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
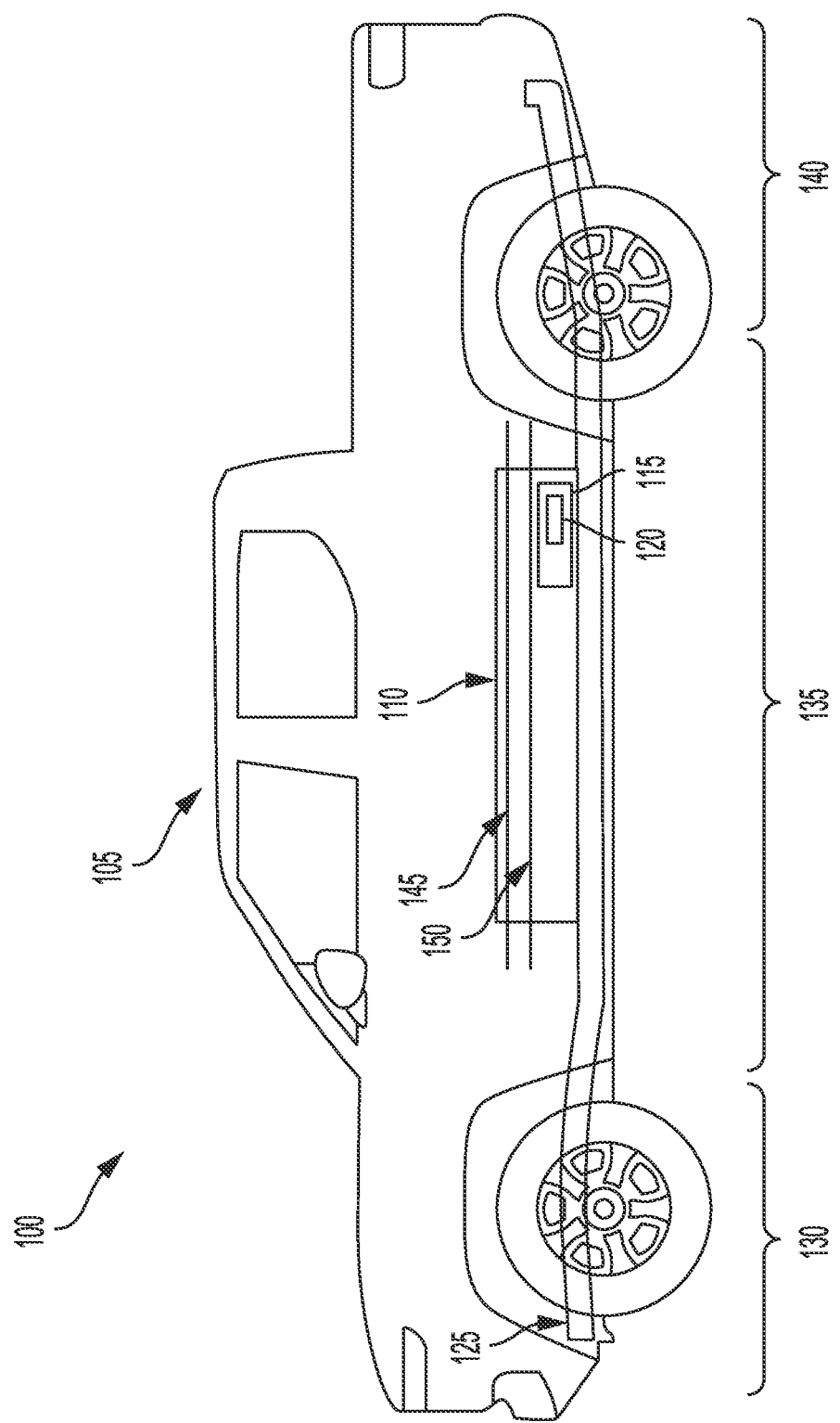
FIG. 1 depicts an electric vehicle, in accordance with an implementation.

Following below are more detailed descriptions of various concepts related to, and implementations of, methods, apparatuses, and systems of a coupling member. The various concepts introduced above and discussed in greater detail below may be implemented in any of numerous ways.

The present disclosure is directed to systems and methods of one or more components for a vehicle. The components can include a coupling member. The coupling member can include a movable and/or a flexible linkage. The coupling member can be disposable between portions of a busbar. For example, the coupling member can be disposed between a first portion and a second portion of a busbar. The coupling member can couple the first portion with the second portion. For example, the coupling member can be attached to both the first portion and the second portion, and the coupling member can integrate the first portion with the second portion. The components can include an apparatus. The apparatus can include the coupling member. The apparatus can also include one or more portions of a busbar. The apparatus can also be provided as one or more separate components for a vehicle.

The coupling member can include one or more segments. For example, the coupling member can include a first segment that is parallel with a third segment. To continue this example, the first segment can be perpendicular with a second segment. The second segment can integrate the first segment with the third segment. For example, the second segment can be disposed between the first segment and the third segment. To continue this example, the second segment can connect the first segment with the third segment.

The first portion of the busbar can connect with a component of a drive unit assembly. For example, the first portion of the busbar can be connectable with a inverter (e.g., a component of a drive unit assembly). The second portion of the busbar can connect with a component of a drive unit assembly. For example, the second portion of the busbar can be connectable with an stator (e.g., a component of a drive unit assembly).

During an assembly process and/or coupling process between drive unit assembly components, a gap can be present to provide clearance and/or space between components. The gap can prevent and/or avoid contact between the components. For example, the gap can prevent damage from occurring to a stator as the stator is placed inside of the vehicle. The gap can remain after the components have been placed and/or installed in the vehicle. For example, a gap can exist between a stator and an inverter even after both components have been installed in the vehicle. Forces can be applied to busbars to reduce and/or remove the gap between the components. These forces can damage and/or stress various parts of the components. For example, stator leads can be damaged as a result of pushing and/or pulling a busbar towards an inverter lead.

The disclosed solutions have a technical advantage of providing a coupling member that can be disposed between portions of a busbar. The coupling member can remove and/or eliminate stresses placed on components of the drive unit assembly. For example, the coupling member can allow a first portion of a busbar to move relative to a second portion of the busbar. To continue this example, the position or placement of the second portion of the busbar can be maintained to reduce stresses that are placed on the stator. Some of the present technical solutions also include the arrangement or placement of the coupling member. For example, the coupling member can include one or more segments. The segments can include curved portions to provide degrees of freedom for the portions of the busbar to move relative to one another.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

The battery pack 110 can provide power to electric vehicle 105. Battery packs 110 can include any arrangement or network of electrical, electronic, mechanical or electro-mechanical devices to power a vehicle of any type, such as the electric vehicle 105. The battery pack 110 can include at least one housing. The housing can include at least one battery module 115 or at least one battery cell 120, as well as other battery pack components. The battery module 115 can be or can include one or more groups of prismatic cells, cylindrical cells, pouch cells, or other form factors of battery cells 120. The housing can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line that can distribute fluid through the battery pack 110 as part of a thermal/temperature control or heat exchange system that can also include at least one thermal component (e.g., cold plate). The thermal component can be positioned in relation to a top submodule and a bottom submodule, such as in between the top and bottom submodules, among other possibilities. The battery pack 110 can include any number of thermal components. For example, there can be one or more thermal components per battery pack 110, or per battery module 115. At least one cooling line can be coupled with, part of, or independent from the thermal component.

The battery modules 115 can each include a plurality of battery cells 120. The battery modules 115 can be disposed within the housing of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing.

The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting.

The battery cell 120 can be included in battery modules 115 or battery packs 110 to power components of the electric vehicle 105. The housing can be disposed in the battery module 115, the battery pack 110, or a battery array installed in the electric vehicle 105. The battery cell housing can be of any shape, such as cylindrical with a circular, elliptical, or ovular base, among others. The shape of the housing can also be prismatic with a polygonal base. The housing can include a pouch form factor. The housing can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

Figure 2:
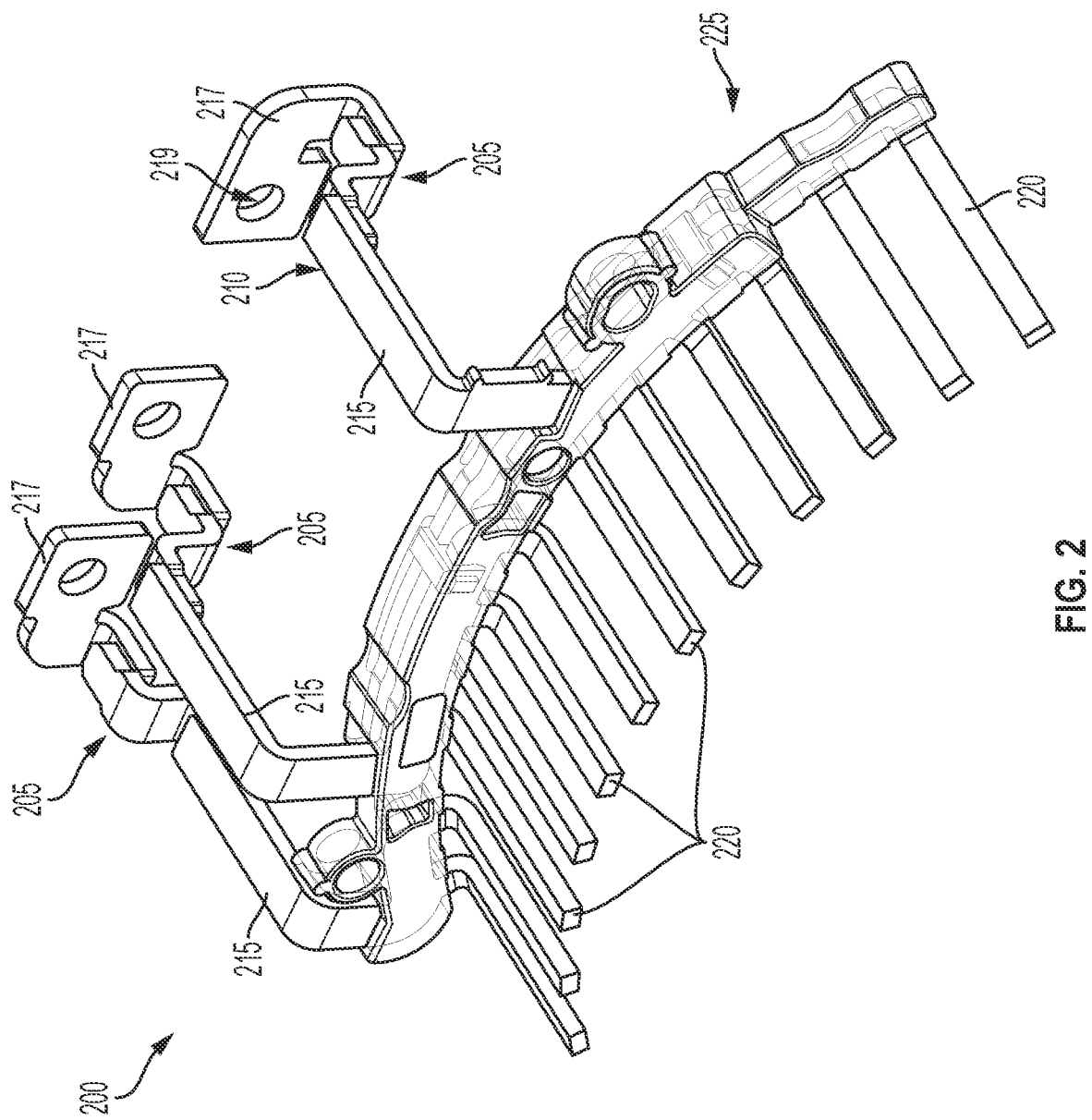
FIG. 2 depicts a perspective view of an apparatus, in accordance with an implementation.

FIG. 2 depicts a perspective view of an apparatus 200. The apparatus 200 can include the apparatus described herein. For example, the apparatus 200 can provide at least one of the technical solutions described herein. The apparatus 200 can be coupled with a vehicle. For example, the apparatus 200 can be coupled with the vehicle 105. The apparatus 200 can be coupled with the vehicle 105 by at least one of attaching, mounting, securing, and/or connecting the apparatus 200 with the vehicle 105.

The apparatus 200 can include at least one member 205. The member 205 can include a coupling member. The member 205 can include the coupling member described herein. The member 205 can be disposed between one or more portions of a busbar 210. For example, the member 205 can be disposed between portion 215 and portion 217 of the busbar 210. The portion 217 can include a first portion. The portion 215 can include a second portion. The member 205 can be disposed between the first portion 217 and the second portion 215 by at least one of placing, locating, positioning, and/or orienting the member 205 between the first portion 217 and the second portion 215.

The member 205 can couple the first portion 217 with the second portion 215. For example, the member 205 can be connected with the first portion 217 and the member 205 can be connected with the second portion 215. The member 205 can connect the first portion 217 with the second portion 215 by at least one of attaching, mounting, or securing the first portion 217 with the second portion 215.

The first portion 217 can connect with at least one component of a drive unit assembly. For example, the first portion 217 can couple with one or more leads of an inverter (e.g., a component of a drive unit assembly). The first portion 217 can include at least one aperture 219. The aperture 219 can receive at least one fastener. For example, a bolt can be inserted into the aperture 219. The aperture 219 can electrically couple the first portion 217 with the inverter. For example, the aperture 219 receiving a fastener can electrically couple the first portion 217 with the inverter. The second portion 215 can connect with at least one component of a drive unit assembly. For example, the second portion 215 can couple with leads 220 of a stator 225.

The first portion 217 or the second portion 215 can move or otherwise flex via the coupling member 205. For example, the coupling member 205 can be flexible or movable. The coupling member 205 can pivot, hinge, rotate, slide, or otherwise move relative to the second portion 215 or the first portion 217. The coupling member 205 can enable the first portion 217 to move relative to the second portion 215. For example, the first portion 217 can move from a first position to a second position. To continue this example, a position of the second portion 215 can be maintained (e.g., unchanged) when the first portion 217 is in the first position or the second position. The second portion 215 can move separate to the first portion 217. For example, the second portion 215 can move relative to the first portion 217. As another example, the second portion 215 can move from a first position to a second position and a position of the first portion 217 can be maintained as the second portion 215 moves from the first position to a second position.

The first portion 217 can move from a first position to a second position. The first portion 217 can move between positions via the member 205. For example, the first portion 217 can move from a first position to a second position via the member 205 extending, sliding, and/or moving as force is applied to the first portion 217. The first portion 217 can move between positions to adjust a distance between the first portion 217 and a component of a drive unit assembly. For example, the first portion 217 can move from a first position to a second position to reduce a distance or a gap between the first portion 217 and one or more leads of an inverter.

Figure 3:
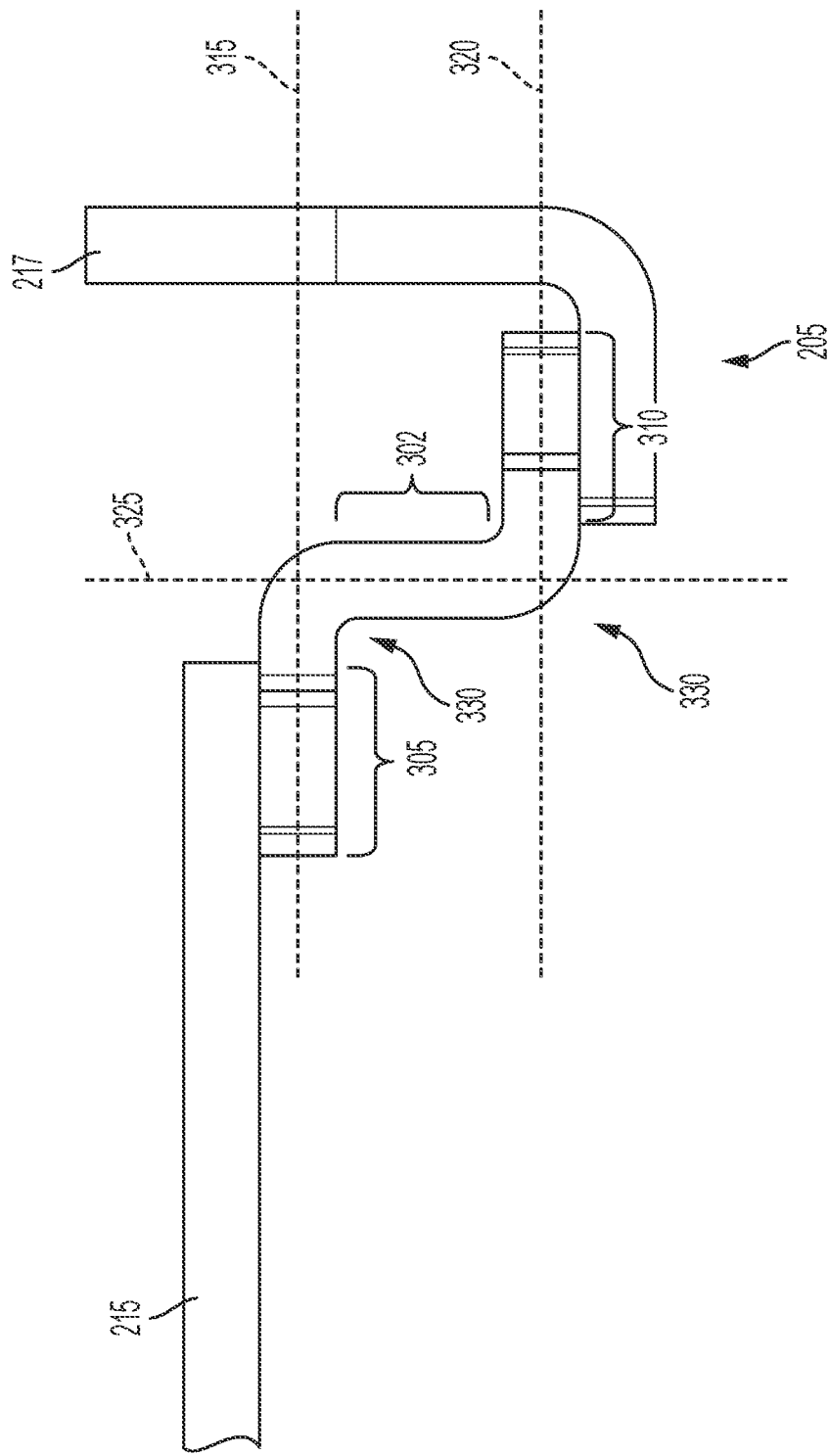
FIG. 3 depicts a side view of the apparatus illustrated in FIG. 2, in accordance with an implementation.

FIG. 3 depicts a perspective side view of the apparatus 200 showing greater details of the member 205. The member 205 can include at least one segment. For example, the member 205 can include segment 302, segment 305, and segment 310. The segments can be integrated with one another. For example, the segment 302 can integrate the segment 305 with the segment 310. The segment 305 can include a first segment. The segment 302 can include a second segment. The segment 310 can include a third segment.

The first segment 305 can extend or travel along a plane 315. The first segment 305 can be connected with the second portion 215. The first segment 305 can be connected with the second segment 302. The third segment 310 can be connected with the second segment 302. The second segment can integrate the first segment 305 with the third segment 310. For example, the second segment 302 can connect the first segment 305 with the third segment 310. The first segment 305 and the second segment 302 can be distinguished from one another via a curve 330 or a curved portion 330.

The second segment 302 can include the curved portion 330. The second segment 302 can include one or more curved portions 330. For example, a first end and a second end of the second segment 302 can include the curved portion 330. The second segment 302 can extend or travel along a plane 325. The third segment 310 can extend or travel along plane 320. The member 205 can include one or more additional or intermediate segments. For example, the member 205 can include a fourth segment located between the second segment 302 and the third segment 310. At least one segment of the member 205 can include curved portions 330. FIG. 3 depicts an example of the second segment 302 include two curved portions 330.

The first segment 305 can be parallel with the third segment 310. For example, the plane 315 and the plane 320 can be parallel planes. The first segment 305 can be perpendicular to the second segment 302. For example, the plane 315 and the plane 325 can be perpendicular planes. Parallel planes can refer to or include planes having an angular difference of 0 degrees. Parallel planes can also refer to or include planes having an angular difference that is plus or minus 10 degrees relative to 0 degrees (e.g., angles between −10 degrees and 10 degrees). Perpendicular planes can refer to and/or include planes having an angular difference of 90 degrees. Perpendicular planes can also refer to or include planes having an angular difference that is plus or minus 10 degrees relative to 90 degrees (e.g., angles between −100 degrees and −80 degrees, and angles between 80 degrees and 100 degrees).

While some segments of the member 205 have been described herein as being parallel or perpendicular to one or more other segments of the member 205, the segments of the member 205 can include one or more orientations, configurations, or placement relative to one another. For example, the first segment 305 can be parallel to the second segment 302. As another example, the first segment 305 can be perpendicular to the third segment 310. The segments of the member 205 can be positioned relative to one another by one of more angles. For example, the first segment 305 may be located or positioned at a 45 degree angle relative to the second segment 302. The segments of the member 205 can include one or more shapes. For example, the first segment 305 may include or be implemented as a square. As another example, the second segment 302 may include or be implemented as a rectangle.

The first portion 217 can move in one or more directions. For example, the first portion 217 can move along at least one of the various planes described herein. The first portion 217 can move via the member 205 in a first direction along a plane. For example, the third segment 310 can move along the plane 320 and the first portion 217 can move, via the third segment 310, along the plane 320.

Figure 4:
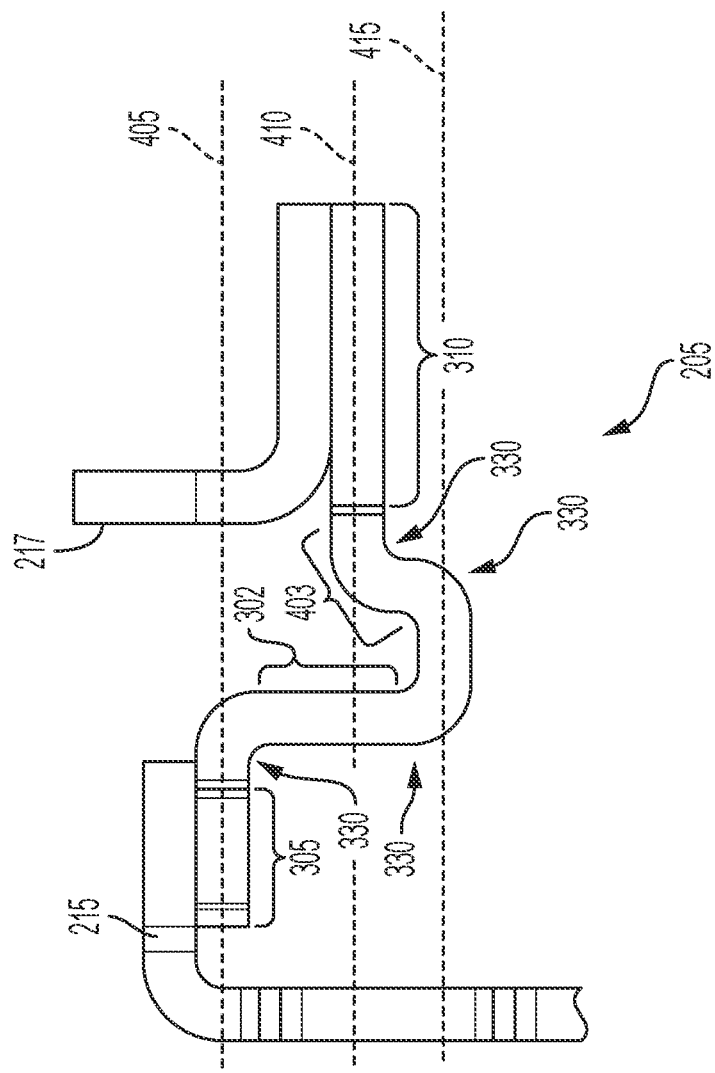
FIG. 4 depicts a side view of the apparatus illustrated in FIG. 2, in accordance with an implementation.

FIG. 4 depicts a perspective side view of the apparatus 200 showing greater details of the member 205. The member 205 can include a segment 403. The segment 403 can include a fourth segment. The fourth segment 403 can be disposed between the second segment 302 and the third segment 310. The fourth segment 403 can be parallel to the second segment 302. The fourth segment 403 can be perpendicular to the first segment 305. The fourth segment 403 can be perpendicular to the third segment 310. The fourth segment 403 can include at least one curved portion 330.

Figure 5:
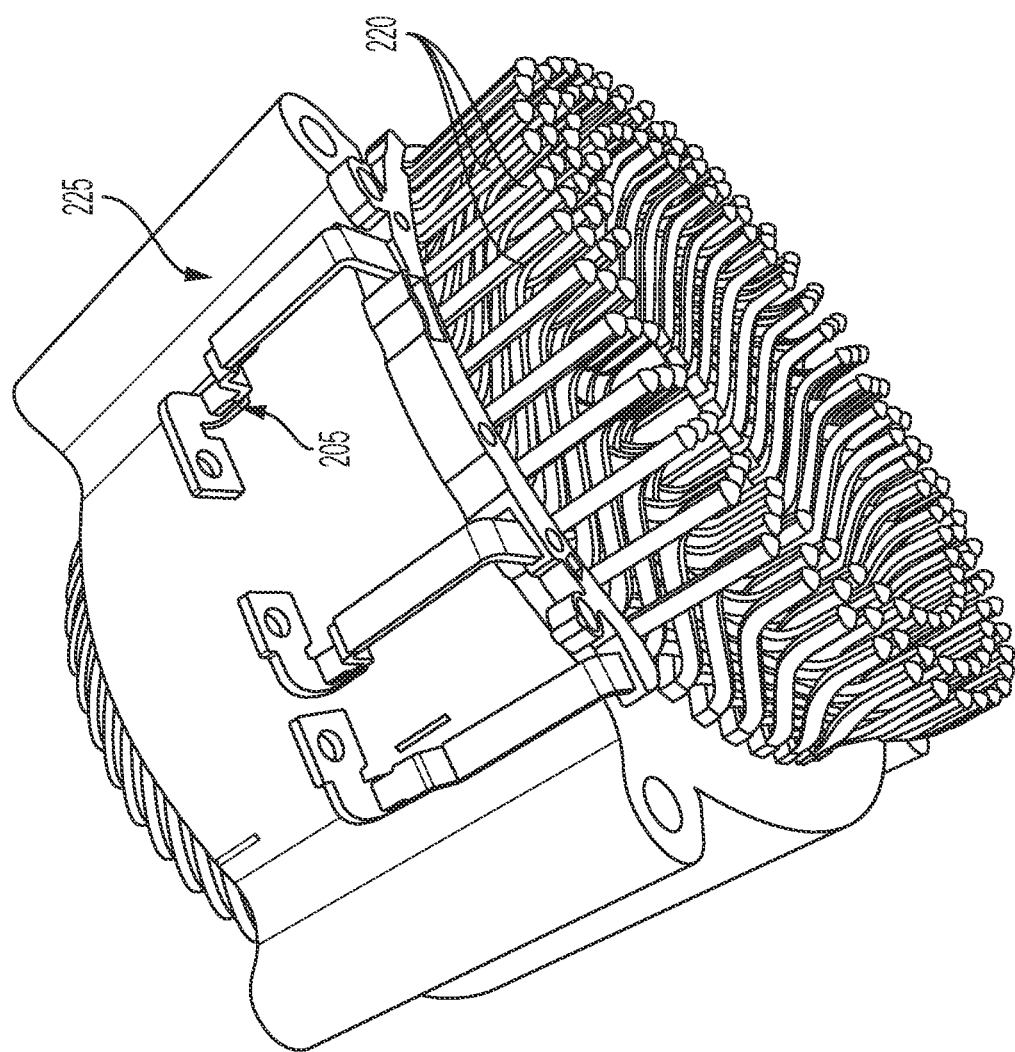
FIG. 5 depicts a perspective view of a stator including the apparatus illustrated in FIG. 2, in accordance with an implementation.

FIG. 5 depicts a perspective view of the stator 225. The stator 225 can include the stator described herein. The stator 225 can include the apparatus 200. The second portion 215 of the apparatus 200 can be connected with the stator 225. For example, the second portion 215 can be coupled with the leads 220 of the stator 225. The stator 225 can be disposed within a vehicle. For example, the stator 225 can be disposed within the vehicle 105. The stator 225 can disposed within a vehicle by at least one of placing, locating, and/or positioning the stator 225 within the vehicle.

Figure 6:
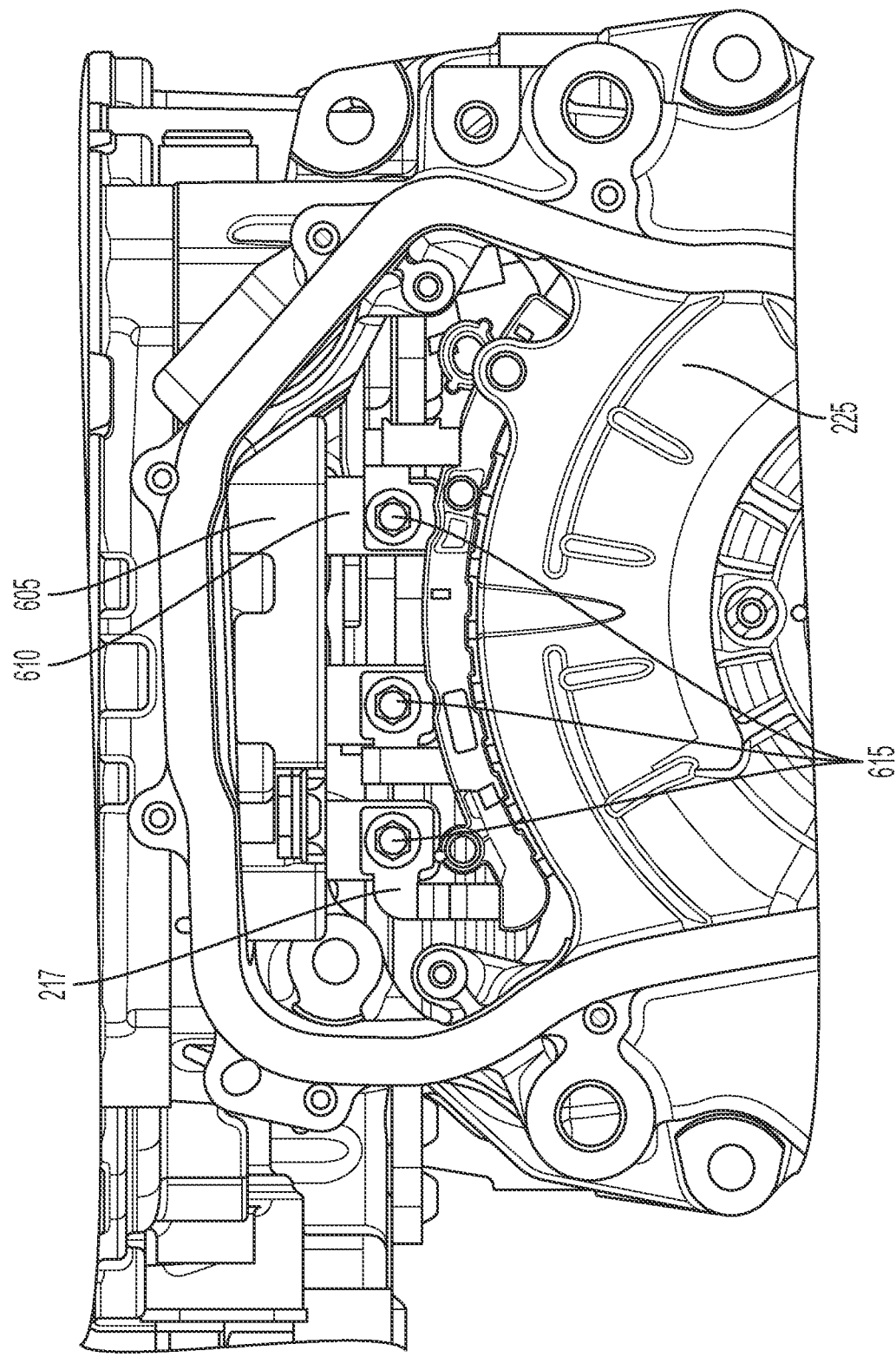
FIG. 6 depicts a cross-sectional view of a vehicle including the apparatus illustrated in FIG. 2 and the stator illustrated in FIG. 5, in accordance with an implementation.

FIG. 6 depicts a cross-sectional view of a vehicle. The vehicle can include the vehicle 105. The vehicle 105 can include the apparatus 200, the stator 225, and an inverter 605. The inverter 605 can include at least one lead 610. The first portion 217 can electrically couple with the inverter 605. For example, a fastener 615 can be inserted into the aperture 219 to electrically couple the first portion 217 with the leads 610. The second portion 215 can be electrically coupled with the stator 225. For example, the second portion 215 can be coupled with the leads 220. The busbar 210 can electrically couple the stator 225 with the inverter 605. For example, the first portion 217 can be electrically coupled with the inverter 605 and the second portion 215 can be electrically coupled with the stator 225.

Figure 7:
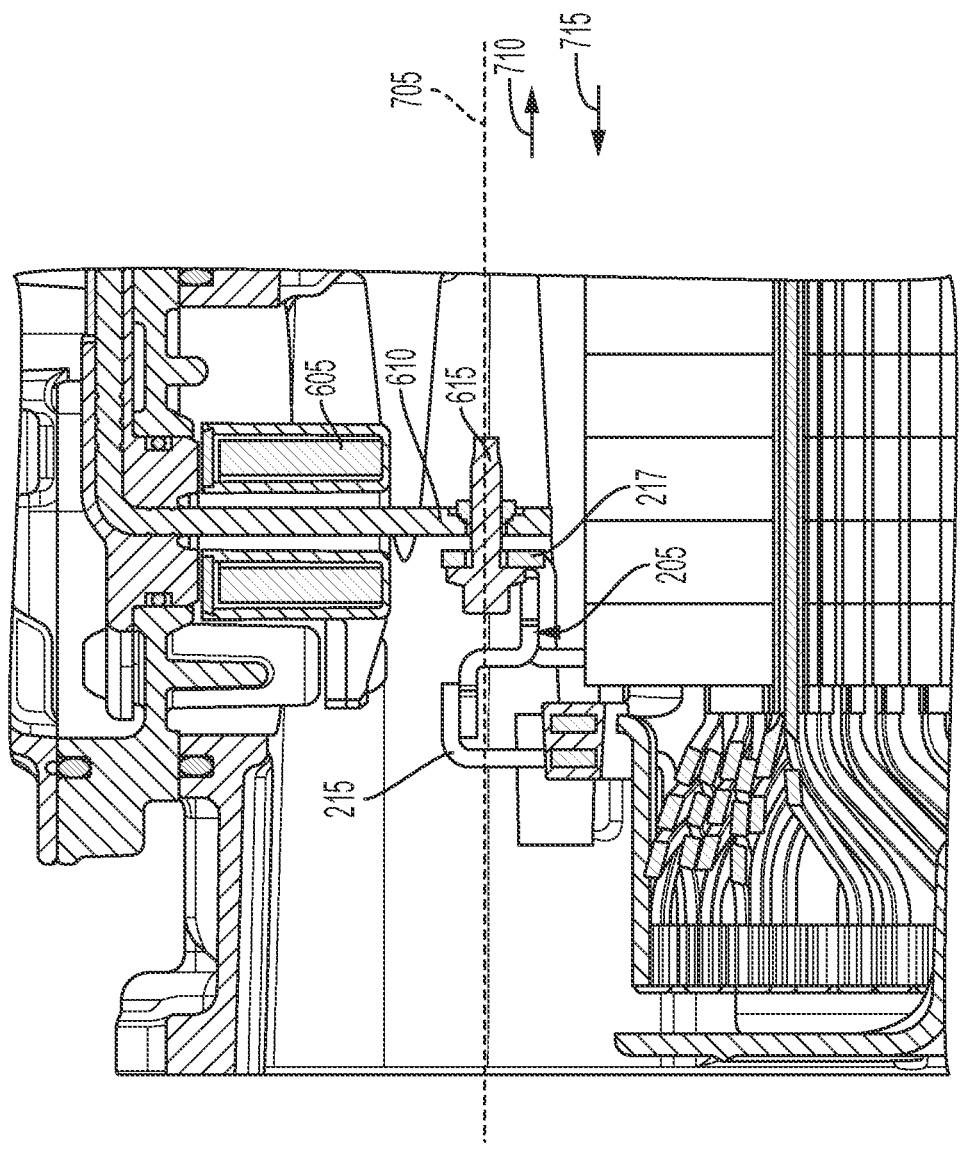
FIG. 7 depicts a cross-sectional side view of a vehicle including the apparatus illustrated in FIG. 2 and the stator illustrated in FIG. 5, in accordance with an implementation.

FIG. 7 depicts a cross-sectional side view of a vehicle. The vehicle can include the vehicle depicted in FIG. 6. The vehicle can include the vehicle 105. The first portion 217 can move along a plane 705. The first portion 217 can move in at least one direction. For example, the first portion 217 can move in a direction 710 along the plane 705. As another example, the first portion 217 can move in a direction 715 along the plane 705. The first portion 217 can move in the direction 710 to reduce a distance between the first portion 217 and the leads 610. The first portion 217 can move in the direction 715 to increase a distance between the first portion 217 and the leads 220.

Figure 8:
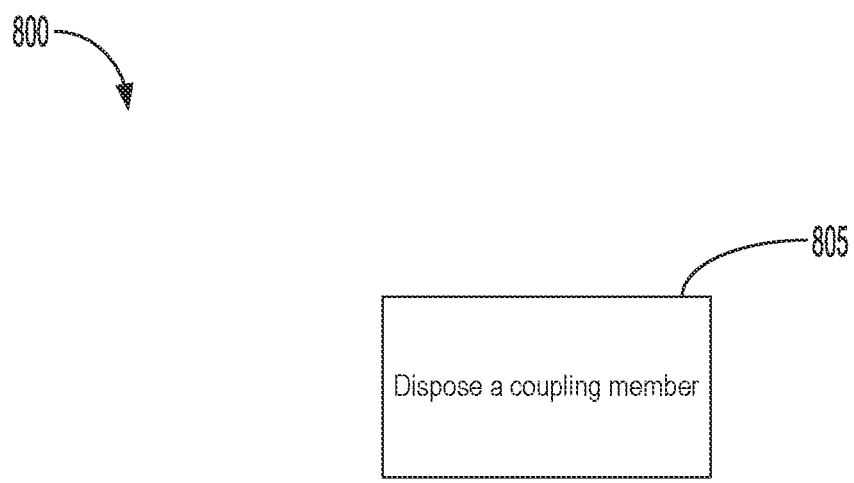
FIG. 8 depicts a flow diagram of a process of manufacturing an apparatus, in accordance with an implementation.

FIG. 8 depicts a flow diagram of a process 800 for manufacturing an apparatus. The apparatus can include the apparatus 200. The apparatus 200 can include the member 205. The manufacturing of the apparatus 200 can include providing the apparatus 200. For example, the apparatus 200 can be provided during assembly of the vehicle 105. The apparatus 200 can be provided responsive to the apparatus 200 having been purchased.

At step 805 a coupling member can be disposed. For example, the coupling member can be disposed between one or more portions of a busbar. The coupling member can include the member 205. The member 205 can be disposed between the first portion 217 and the second portion 215 of the busbar 210. The member 205 can be disposed between the first portion 217 and the second portion 215 by at least one of placing, locating, or positioning the member 205 between the first portion 217 and the second portion 215. The first portion 217 can be connectable to a first component of a drive unit assembly. For example, the first portion 217 can connect with the inverter 605. The second portion 215 can be connectable to a second component of the drive unit assembly. For example, the second portion 215 can connect with the stator 225.

The member 205 can couple the first portion 217 with the second portion 215. For example, the member 205 can be connected with the first portion 217 and the member 205 can be connected with the second portion 215. To continue this example, the member 205 can connect the first portion 217 with the second portion 215 responsive to the member 205 being connected to both the first portion 217 and the second portion 215. The member 205 can include the first segment 305, the second segment 302, and the third segment 310. The first segment 305 can be parallel to the third segment 310. The first segment 305 can be perpendicular to the second segment 302.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
   a coupling member configured to dispose between a first portion of a busbar connectable to a first component of a drive unit assembly and a second portion of the busbar connectable to a second component of the drive unit assembly;
   the coupling member configured to couple the first portion of the busbar with the second portion of the busbar;
   the coupling member configured to allow the first portion of the busbar to move relative to the second portion of the busbar or to allow the second portion of the busbar to move relative to the first portion of the busbar; and
   the coupling member including a first segment, a second segment, and a third segment;
   the first segment parallel to the third segment and the first segment perpendicular to the second segment.

2. The apparatus of claim 1, comprising:
   the second segment including a curved portion and the second segment to integrate the first segment with the third segment.

3. The apparatus of claim 1, comprising:
   the coupling member including a fourth segment having a curved portion;
   the fourth segment parallel to the second segment;
   the fourth segment perpendicular to the first segment; and
   the fourth segment perpendicular to the third segment; and
   the first segment connectable to the second portion of the busbar and the third segment connectable to the first portion of the busbar.

4. The apparatus of claim 1, comprising:
   the first portion of the busbar configured to move, via the coupling member, from a first position to a second position to adjust a distance between the first portion of the busbar and the first component of the drive unit assembly.

5. The apparatus of claim 1, comprising:
   the first portion of the busbar configured to move, via the coupling member, in a first direction along a first plane.

6. The apparatus of claim 1, wherein the first component of the drive unit assembly includes an inverter, wherein the second component of the drive unit assembly includes a stator, and wherein the apparatus further comprises:
   the first portion of the busbar configured to electrically couple with the inverter and the second portion of the busbar configured to electrically couple with the stator to electrically couple the inverter with the stator.

7. The apparatus of claim 1, comprising:
   the first portion of the busbar configured to move, via the coupling member, relative to the second portion of the busbar without movement of the second portion of the busbar.

8. The apparatus of claim 1, comprising:

the first portion of the busbar including an aperture configured to receive a fastener to electrically couple with the first component of the drive unit assembly.

9. The apparatus of claim 1, comprising:

the coupling member configured to:

provide a first distance between the first portion of the busbar and a portion of a vehicle configured to receive the first component of the drive unit assembly; and reduce an amount of stress placed on at least one of the first component of the drive unit assembly or the second component of the drive unit assembly with the first portion of the busbar coupled with the first component of the drive unit assembly.

10. A vehicle, comprising:

an apparatus, including:

a coupling member configured to dispose between a first portion of a busbar connectable to a first component of a drive unit assembly and a second portion of the busbar connectable to a second component of the drive unit assembly;

the coupling member configured to couple the first portion of the busbar with the second portion of the busbar, the first portion of the busbar configured to move, via the coupling member, in a first direction along a first plane; and the coupling member including a first segment, a second segment, and a third segment;

the first segment parallel to the third segment and the first segment perpendicular to the second segment.

11. The vehicle of claim 10, wherein:

the second segment includes a curved portion and the second segment to integrate the first segment with the third segment.

12. The vehicle of claim 10, wherein:

the coupling member includes a fourth segment having a curved portion;

the fourth segment parallel to the second segment;

the fourth segment perpendicular to the first segment; and the fourth segment perpendicular to the third segment; and the first segment connectable to the second portion of the busbar and the third segment connectable to the first portion of the busbar.

13. The vehicle of claim 10, wherein:

the coupling member is configured to allow the first portion of the busbar to move relative to the second portion of the busbar or to allow the second portion of the busbar to move relative to the first portion of the busbar.

14. The vehicle of claim 10, wherein:

the first portion of the busbar is configured to move, via the coupling member, from a first position to a second position to adjust a distance between the first portion of the busbar and the first component of the drive unit assembly.

15. The vehicle of claim 10, wherein:

the first component of the drive unit assembly includes an inverter;

the second component of the drive unit assembly includes a stator;

the first portion of the busbar is configured to electrically couple with the inverter and the second portion of the busbar is configured to electrically couple with the stator to electrically couple the inverter with the stator.

16. A method, comprising:

disposing a coupling member between a first portion of a busbar connectable to a first component of a drive unit assembly and a second portion of the busbar connectable to a second component of the drive unit assembly;

the coupling member configured to couple the first portion of the busbar with the second portion of the busbar, the first portion of the busbar configured to move, via the coupling member, from a first position to a second position to adjust a distance between the first portion of the busbar and the first component of the drive unit assembly; and the coupling member including a first segment, a second segment, and a third segment;

the first segment parallel to the third segment and the first segment perpendicular to the second segment.

17. The method of claim 16, wherein:

the second segment including a curved portion and the second segment to integrate the first segment with the third segment.

18. The method of claim 16, wherein:

the coupling member including a fourth segment having a curved portion;

the fourth segment parallel to the second segment;

the fourth segment perpendicular to the first segment; and the fourth segment perpendicular to the third segment; and the first segment connectable to the second portion of the busbar and the third segment connectable to the first portion of the busbar.

\* \* \* \* \*